United States Patent [19]
Powell

[11] Patent Number: 5,163,471
[45] Date of Patent: Nov. 17, 1992

[54] LOW-PRESSURE PILOT VALVE

[76] Inventor: Walter W. Powell, 13911 Emerald Forest, Sugar Land, Tex. 77478

[21] Appl. No.: 888,900

[22] Filed: May 26, 1992

[51] Int. Cl.⁵ ............................................. G05D 16/06
[52] U.S. Cl. .................................... 137/494; 137/489; 137/86; 251/86
[58] Field of Search ...................... 137/489, 492, 492.5, 137/86, 494; 251/86, 61.5

[56] References Cited

U.S. PATENT DOCUMENTS

| | | | |
|---|---|---|---|
| 3,124,147 | 3/1964 | Hallett | 137/86 |
| 3,477,456 | 11/1969 | Powell | |
| 3,583,432 | 6/1971 | Powell | 137/489 |
| 4,284,039 | 8/1981 | Bellicardi | 251/86 X |

OTHER PUBLICATIONS

Sales brochure by Groth Corporation—Pilot Operated Valves (undated).

Primary Examiner—Alan Cohan

[57] ABSTRACT

An improved pilot valve is disclosed having a flow path from the inlet to the sense cavity via the valve spindle. An articulated disk is provided at the bottom of the valve spindle and is secured thereto by a hollow screw. Such articulated disk can adjust itself to the valve seat below to provide sealing of the valve to the seat in cases where the valve spindle is not perfectly axially aligned with the seat. A spacer between the upper and lower diaphragms is provided for maintenance of proper effective areas of such diaphragms and for prevention of resistance to valve stem motion.

6 Claims, 1 Drawing Sheet

LOW-PRESSURE PILOT VALVE

BACKGROUND OF THE INVENTION

1. Field of the Invention

This invention relates to the field of pilot valves which control the operation of a main valve. In particular, the invention relates to improvements in pilot valves used to relieve pressures higher than a predetermined set pressure via a main valve on a vessel such as a tank for storing hydrocarbons.

2. Description of the Prior Art

A prior patent, U.S. Pat. No. 3,477,456 issued Nov. 11, 1969, in the name of the instant inventor describes a pressure responsive pilot controlled valve of which the invention described below is an improvement. The pilot valve of the '456 patent is disposed atop the dome of a main valve which has its inlet in communication with a tank, the pressure of which is to be sensed and controlled. A large diaphragm valve in the main valve is controlled by the pressure in the dome, which in turn is controlled by the pressure in a port of the pilot valve. (In actual practice, the pilot valve of the '456 patent has also been used to control a piston-type main valve.) The pilot valve is connected to the inlet of the main valve, and reacts to a set pressure level to lower the pressure in the port of the pilot valve and in the dome of the main valve to cause the diaphragm in the main valve to open, thereby opening a main valve flow path from inlet to outlet, thereby relieving the pressure level in the tank. When main valve inlet pressure is reduced, the pilot valve senses such reduction in pressure, raises the pressure in its port, and as a result the pressure in the dome of the main valve, with the result that the diaphragm of the main valve closes again.

The pilot valve of the '456 patent includes a diaphragm case having two diaphragms in it thereby creating a lower cavity (called a boost cavity) and a cavity between the two diaphragms (called a sense cavity). A valve spindle is connected to the two diaphragms. A pilot spring is placed between the valve spindle and the case of the valve. The lower end of the valve opens and closes about a valve seat about the port of the valve which is connected to the main valve. When the valve is open, a flow path exists between an exhaust port to atmosphere, thereby applying atmosphere pressure via the valve port to the dome of the main valve.

Under normal operating conditions, tank (or system) pressure acts on the bottom of the main valve seat and on top of the main valve diaphragm via the port of the pilot valve. The main valve seat is held tightly closed by a large force equal to the tank pressure times the differential areas of the main valve diaphragm.

Tank pressure is directly applied to the boost cavity and to the sense cavity downstream of a variable orifice from the inlet of the pilot valve which is in communication with the inlet or tank pressure from the main valve. The soft pilot seat is held closed by the pilot spindle valve because the force of the spring on the spindle is greater than the upward forces acting on the upper or sense diaphragm.

Set pressure is that pressure at which the upward force on the upper pilot diaphragm (that is, the sense diaphragm) exceeds the spring force. At such pressure, the pilot spindle lifts slightly, causing a small flow of fluid across a blowdown adjustment orifice via the port to the pilot exhaust to the atmosphere. This small flow across the blowdown adjustment orifice causes a reduction in pressure downstream of this orifice and in the sense cavity. Even though this is only a small reduction in pressure, it creates a large net upward force which rapidly opens the pilot seat. That is, it "snaps" the pilot spindle full open and immediately exhausts the main valve dome to atmosphere. As a result, the main valve rapidly opens also.

When the pressure in the tank is reduced, the lifting force created by pressures in the sense cavity and the boost cavity are equalized. As a result, the spindle constricts flow across the adjustable orifice thereby reducing sense cavity pressure which in turn reduces spindle left which urges the pilot closed thereby causing the main value also to close.

One disadvantage of the pilot valve of the '456 patent exists in that it includes a variable blowdown adjustment orifice as well as a fixed orifice. Another disadvantage of the pilot valve of the '456 patent concerns an external conduit from a point between the adjustable orifice and the fixed orifice to the sense cavity between the upper and lower diaphragms in the diaphragm case. Such external conduit provides a long path from the adjustable orifice to the sense cavity.

IDENTIFICATION OF OBJECTS OF THE INVENTION

A primary object of the invention is to provide an internal communication path through the valve spindle itself to the sense cavity so as to provide a more compact construction of a pilot valve while also providing a construction of such valve which permits sealing of the valve to its seat where the valve spindle is not perfectly axially aligned with the seat.

SUMMARY OF THE INVENTION

The object identified above as well as other advantages and features are incorporated in an improved pilot valve for controlling a main valve. The pilot valve is of the type having lower and upper diaphragms in a diaphragm case. A first or "boost" chamber is defined beneath the lower diaphragm; a second or sense chamber is defined between the lower and upper diaphragms. Inlet pressure is applied to the first chamber. Actuator pressure is applied to the second chamber through a hollow stem of a valve secured to the diaphragm. A spring biases the valve in a closed position against a valve seat. Due to the differential areas of the lower and upper diaphragms and inlet pressure acting below the lower diaphragm, lifting force increases with decreasing sense pressure. Sense pressure decreases during flow due to a restriction in the flow path between the inlet and an exhaust passage. Fluid flow occurs in such flow path when the valve begins to lift off its seat in response to increased inlet pressure rising above set pressure.

The improvement of the invention regards an articulated disk secured to the bottom end of the valve stem. Such disk is secured to the valve stem by means of a hollow screw thereby providing the pressure flow path from the valve to the sense chamber while simultaneously allowing the disk to align itself with the valve seat for proper sealing thereto. An "O" ring seals the disk to the valve. A spacer between the upper and lower diaphragms is provided for maintenance of proper effective areas of such diaphragms and for prevention of resistance to valve stem motion. Such spacer is of a proper thickness so that the upper and lower diaphragms remain flat and unstressed when the valve is closed.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Figure 1:
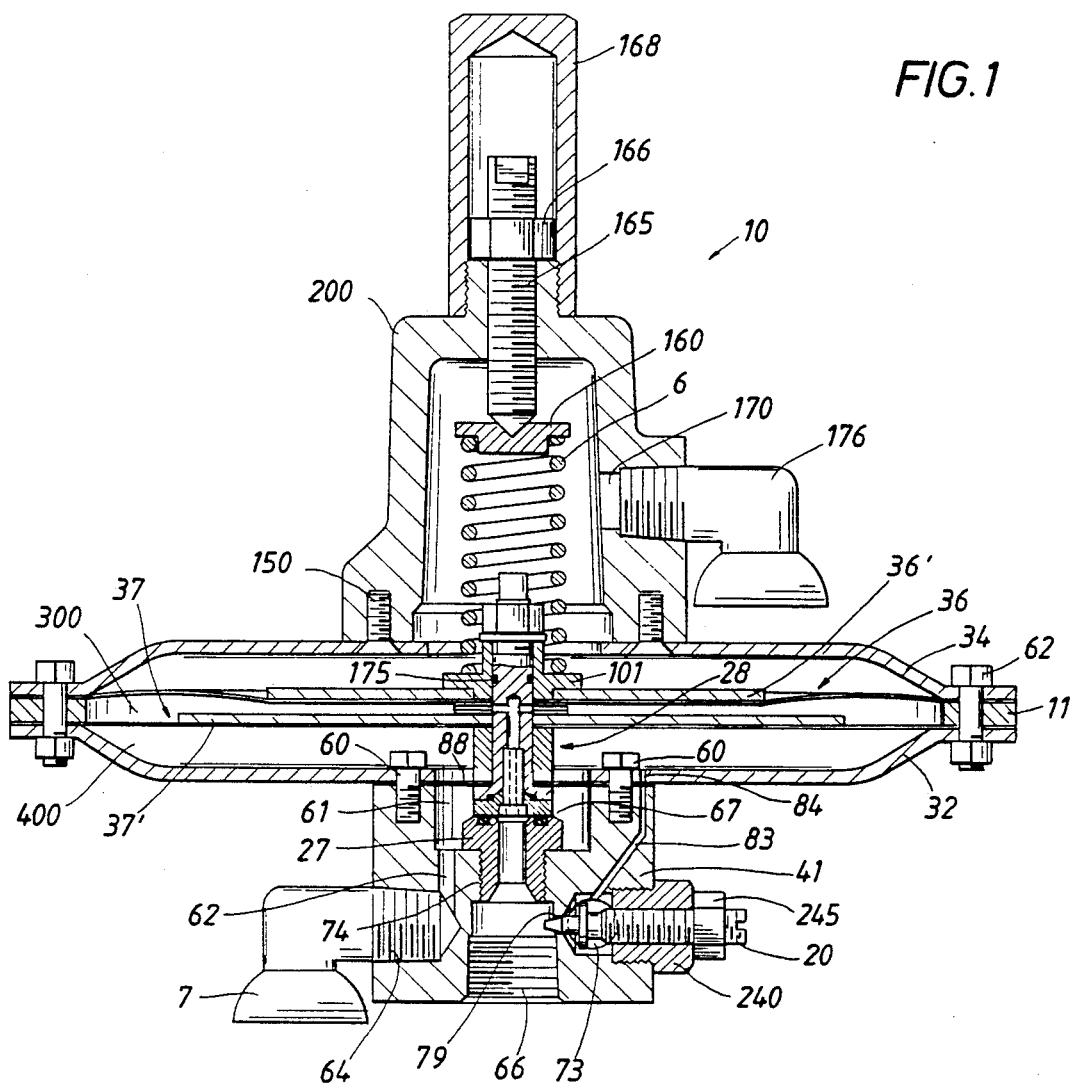
FIG. 1 is a cross section of the improved pilot valve of the invention.
Figure 2:
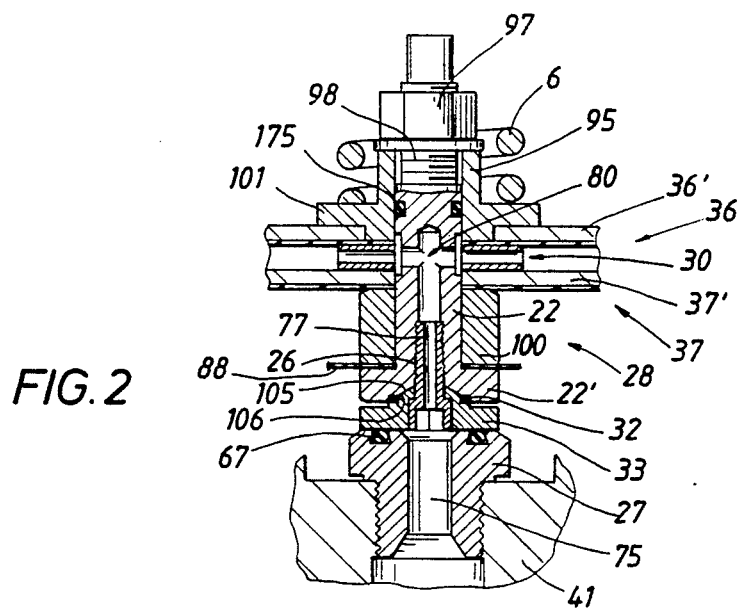
FIG. 2 is an enlarged cross sectional view of a portion of the pilot valve of FIG. 1 showing in an enlarged fashion the valve spindle with a bottom articulated disk and showing the valve seat.

The improved pilot valve 10 of FIGS. 1 and 2 is secured to a main valve (not shown) below the pilot valve. The threaded opening or port 66 is connected by tubing to the dome of the main valve. The inlet 73 of the pilot valve 10 is connected by tubing to a pilot pickup connection to the main valve.

The pilot valve 10 includes a valve body 41 in which a side inlet 73 and a bottom threaded opening 66 are provided. A diaphragm case, including a lower diaphragm case 32 and an upper diaphragm case 34, is secured to valve body 41 by threaded fasteners 60.

The diaphragm case 32, 34 has two diaphragms secured within it. A first or lower diaphragm 37 and a second or upper diaphragm 36 are separated from each other at their outer peripheral edge by spacer 11. A plurality of bolts and nuts 62 sandwich the upper diaphragm case 34, the upper diaphragm 36, the spacer 11, the lower diaphragm 37, and the lower diaphragm case 32 together.

The lower diaphragm 37 includes a stiff diaphragm plate 37'. The upper diaphragm 36 includes a stiff diaphragm plate 36'. The lower diaphragm plate 37' is of greater diameter than is that of the upper diaphragm plate 36'. As will be explained below, the difference in effective areas of the two diaphragms, as determined by the areas of their respective stiff plates, results in increasing lifting force of the valve 28 with decreasing pressure in port 66 caused by flow across an adjustable orifice when tank pressure rises about set pressure.

As best seen in the enlarged view of FIG. 2, valve 28 includes a spindle or stem 22 having a lower end 22' of increased diameter. The upper end of spindle 22 includes threads 98. The valve 28 is secured to the lower diaphragm 37 and the upper diaphragm 36 by being sandwiched about the spindle 22 with spacer 100 bearing on lower diaphragm 37 above and increased diameter section 22' below and with collar 101 bearing downwardly against upper diaphragm 36 from above. Nut 97 screws down on threads 98 while forcing the collar 101 downwardly. The spindle 22 has passages 80 which bring fluid pressure from below the spindle 22 to hollow passages in a washer 30 placed between the lower diaphragm 37 and the upper diaphragm 36. Like the spacer 11 about the periphery of the two diaphragms, spacer or washer 30 also serves to separate such two diaphragms.

Turning again to FIG. 1, a spring bonnet 200 is secured to upper diaphragm case 34 by threaded fasteners 150. A pilot spring 6 within bonnet 200 is placed such that it is in contact with collar 101 below and with upper washer 160 above. An adjustable screw 165 is threaded within the top part of bonnet 200 so as to allow it to be translated up and down in order to change the amount of downward spring force on valve 28. A lock nut 166 may be screwed down on screw 166 to prevent its translation after a desired spring force on valve 28 has been achieved. A cap 168 is screwed to the top of bonnet 200 to cover adjustable screw 165 and lock nut 166. An exhaust port 170 with bug screen 176 provides atmospheric pressure to the interior of the bonnet 200 and the cavity between upper diaphragm 36 and upper diaphragm case 34. An elastomeric ring 175 in a groove of spindle 22 isolates atmospheric pressure from the cavities below the upper diaphragm 36.

The space between the upper diaphragm 36 and the lower diaphragm 37 is designated the sense cavity 300. The space between the lower diaphragm 37 and the lower diaphragm case 32 is designated the boost cavity 400. An elastomeric diaphragm 88 is provided about spindle 22 sandwiched between spacer 100 and spindle 22 for proper retention and extends outwardly to be sandwiched between lower case 32 and the top of body 41. Fasteners 60 secure lower case 32 to valve body 41 while capturing diaphragm 88 which acts as a seal between case 32 and body 41 while allowing valve 28 to move up and down with respect to case 32. Diaphragm 88 prevents pressure in boost cavity 400 from exhausting through vent 7 and passage 62 to atmosphere. Its effective area is small compared to diaphragm 36 and 37. As a result, its effect in opening and closing valve 28 is negligible.

A passage 83 is provided between inlet 73 through diaphragm 88 and case 32 to cavity 400. As a result, actuator pressure from the main valve below (not shown) which is applied to inlet 73 is always applied to boost chamber 400.

The valve body includes a pilot chamber 61 and a passage 62 which provides fluid communication with a threaded outlet 64. Outlet 64 is fitted with an exhaust fitting 7 which is screwed or pushed into outlet 64. Accordingly, atmospheric pressure always exists in pilot chamber 61 by virtue of its communication with outlet 64 via passage 62.

Within valve body 41 a valve seat member 27 is threaded into it via a threaded opening 74 which communicates with the threaded opening 66. Valve seat member 27 includes an axial passage 75 that runs through it. An elastomeric "O" ring 67 is placed in a groove in the top face of seat member 27 to seal with the bottom surface of valve 28.

Turning again to FIG. 2, the bottom end of spindle 22 of valve 28 has a downward facing concave surface 105. A disk 33 includes an upwardly facing convex surface 106 of complimentary shape to surface 105. Disk 33 is attached to the bottom end of spindle 22 by means of a threaded screw 26 which has an axial passage 77 formed therein and has clearance between the shoulder of screw 26 and disk 33 so that disk 33 may swivel. An elastomeric "O" ring 32 is placed in facing grooves of spindle 22 and disk 33. By virtue of the complimentary mating surfaces 105 and 106 between spindle 22 and seat 27, disk 33 can articulate a small amount with respect to the axis of the spindle 22 so as to achieve seating on "O" ring 67 of seat 27, even when the spindle 22 is not completely axially aligned or concentric with the seat 27. Such articulation is provided while simultaneously providing communication from threaded opening or port 66 and passage 75 via passage 77 of hollow screw 26 and passages 80 to hollow washer 30 and sense cavity 300.

A block or plug 240 is threaded into valve body 41 at the inlet 73. A passage 79 is formed between the inlet 73 and the port or threaded opening 66. A needle 20, which may be screwed in and out of block 240, has its tip placed within passage 79. Such tip may be fully screwed into passage 79 so as to almost fully obstruct fluid flow through passage 79 from inlet 73 to port 66, or such tip may be fully screwed out of the passage 79 so as to cause no obstruction through such passage. Lock nut 245 prevents movement of needle 20 after it has been appropriately set. Passage 83 is located between inlet 73 and passage 79.

OPERATION

Actuating pressure enters the pilot valve 10 at the inlet port 73 and flows through a filter screen (not shown) to remove particulates. In normal operation, valve 28 is forced downwardly by the force of pilot spring 6. The actuating pressure is applied to boost chamber 400 via passage 83 in body 41, a hole in diaphragm 88, and a hole 84 in case 32. The actuating pressure is also provided to sense cavity 300 via inlet 73, passage 79, port 66, passage 75 in seat member 27, hollow screw 26, and passages 80 of valve spindle 22 and hollow washer 30.

Below "set" pressure, as determined by the position of pilot spring 6, the pressure in sense cavity 300 and boost cavity 400 is the same. Under such condition, the valve 28 is seated against seat member 27, sealed by diaphragm 88 and no actuating fluid or pressure escapes to atmosphere via pilot chamber 60, passage 62 and outlet 64. With such a condition, the upper diaphragm 36 and lower diaphragm 37, while having the same outer diameter where they are secured to the diaphragm case 34, 32 with spacer 11, have different effective areas. This is so because the lower or first diaphragm plate 37' has a greater outer diameter than does the upper or second diaphragm plate 36'. Accordingly, the lower diaphragm 37 has a greater effective area than does the upper diaphragm 36.

Below set pressure, with equal pressure in the boost chamber 400 and the sense chamber 300, the forces acting on the lower diaphragm 37 are the same; no upward or downward force is applied to the valve 28 by the lower diaphragm 37. All upward force applied to the valve 28 is via the pressure in the sense cavity 300 acting on the effective area of upper diaphragm 36. Such force is opposed by the downward force of pilot spring 6.

As actuating fluid applied to inlet 73 slowly increases, the upwardly acting force on upper diaphragm 36 increases, and when it equals the "set" pressure as determined by the pilot spring (and the setting of adjustable screw 106), the valve 28 begins to lift from seat member 27. Actuating fluid, as a result, begins to flow from passage 75 into pilot chamber 60 and passage 62 to the atmosphere. The flow through passage 79 obstructed by needle 20 creates a pressure drop through it and in the port 66. Reduced pressure is communicated via screw 26 and passages 80 to sense cavity or chamber 300. The reduced pressure between the sense cavity 300 and the supply pressure in the boost chamber 400 immediately causes an increased total upward force on valve 22 because of the greater pressure below lower diaphragm 37 than above it. This added lift of the valve 22 creates additional flow which creates a greater pressure drop. Depending on the setting of needle 20 (that is, the position of the tip of needle 20 in passage 79), the differential pressure can cause the pilot valve 28 to "snap" fully open at the set pressure of the pilot spring 6, thereby reducing the pressure in the threaded opening or port 66. Such reduction in pressure reduces the pressure of the dome of the main valve below (not shown) causing it to fully open such main valve. Closing of the valve 10 occurs in an opposite manner to its opening.

If the needle 20 is fully backed out so that its tip does not obstruct passage 79, the pressure drop across such passage is reduced causing the pilot valve and consequently the main valve to open in proportion to the amount of over pressure in inlet 73. Such mode of operation is known as modulation.

ADVANTAGES AND FEATURES OF THE INVENTION

It is important that the valve 28 seat precisely on seat 27 and "O" ring 67. Accordingly, the end of the valve 28 must be precisely parallel with valve seat 27 and "O" ring 67. This result is achieved by providing articulated disk 33 at the end of spindle 22 and secured thereto by hollow screw 26. Accordingly, pressure communication is achieved through spindle 22 while simultaneously allowing disk 33 to articulate with respect to the end 22' of spindle 22. Leakage between disk 33 and spindle end 22' is prevented by "O" ring seal 32.

It is also important that the effective area ratio be maintained between the lower diaphragm 37 and the upper diaphragm 36. Spacer 11 helps perform that function by providing the proper thickness to keep the diaphragms 37, 36 flat and unstressed when the valve 28 is closed. Flat diaphragms are essential so that proper seating and opening can be realized.

It is a still further important feature of the invention that fluid pressure be communicated to the sense cavity 300 in the most direct path possible to insure the fastest possible response to an over pressure condition. This is accomplished by passing the fluid pressure directly through the valve spindle 22 while having an articulated disk 22, attached to the spindle 22 by hollow screw 26.

It is still further important that the end of the disk 33 not stick to the top of valve seat 27 and/or "O" ring 67. This is accomplished by applying a non-stick coating such as TEFLON brand of synthetic fluorine containing resin to the bottom surface of disk 33.

Various modifications and alterations in the described methods and apparatus will be apparent to those skilled in the art of the foregoing description which does not depart from the spirit of the invention. For this reason, these changes are desired to be included in the appended claims. The appended claims recite the only limitation to the present invention. The descriptive manner which is employed for setting forth the embodiments should be interpreted as illustrative but not limitative.

What is claimed is:

1. An improved pilot valve including
   a valve body (41),
   said valve body (41) including a port (66), an exhaust outlet (7), and a valve seat (27) surrounding a fluid flow path between said port (66) and said exhaust outlet (7), said valve seat (27) having a valve seat passage (75) extending between its top surface and said port (66),
   a valve (28) supported with respect to said body (41) and adapted to be seated on and unseated from said valve seat (27) to control flow therethrough, pressure responsive means (32, 34, 37, 36) connected to said valve (28) and adapted to move said valve (28), spring means (6) for urging said pressure responsive means in a direction to close said valve, an inlet (73) in said valve body adapted for connection to a source of said pressure fluid, the pressure of which is to be controlled, a passage disposed between said inlet (73) and said port (66), said passage having a restriction disposed therein, first path means (83, 84) for establishing communication between said inlet (73) and said pressure responsive means (32, 37), whereby the pressure of fluid conducted to said pressure responsive means through said first path means urges said pressure responsive means in a direction to unseat said valve (28) from said valve seat (27), second path means for establishing communication between said pressure responsive means (37, 36) and said inlet (73), whereby the pressure of said pressure fluid via said second means urges said pressure responsive means in a direction to seat said valve (28) on said valve seat (27), and to unseat said valve (28) on said valve seat (27), and means for controlling the pressure in said second path means whereby flow occurs through said second path means on the opening of said valve (28) thereby reducing the pressure urging said pressure sensitive means in a direction to seat said valve 28 on said valve seat (27) and to reduce the pressure in said port (66), said pressure responsive means having a diaphragm case (32, 34) supported with respect to said body and having a first diaphragm (37) and a second diaphragm (36) operably mounted therein, said first diaphragm (37) and said case (32) defining a first chamber into which said first means connects, said first (37) and said second (36) diaphragms and said case (32, 34) defining a second chamber into which said second means connects, the effective pressure area of said first diaphragm (37) being greater than the effective pressure area of said second diaphragm (37), wherein the improvement comprises said valve (28) having a stem (22) connected to said first (37) and second (36) diaphragms, and having internal passages (80) for communicating pressure fluid to said second chamber, and a downwardly facing first curved surface (105) on its lower end (22'), a disk (33) having an upwardly facing second curved surface (106) adapted to mate with said first curved surface of said stem and providing articulation of said disk with respect to said stem, said disk having a downwardly facing surface adapted to cooperate with said valve seat (27) to open or close said fluid flow path between said port (66) and said exhaust outlet (7), and a fastener (26) securing said disk (33) to said lower end of said stem, said fastener having an axial passage (77) through it, wherein said second path means is defined by said internal passage (80) of said stem (22), said axial passage (77) through said fastener, said valve seat passage (75), said port (66), said inlet (73) and said passage (79) between said inlet (73) and port (66), and whereby said disk (33) may move with respect to said stem (22) so that said disk can seal against said seat (27) yet maintain said second path means.

2. The improved pilot valve of claim 1 wherein the improvement further comprises a seal (32) placed between said stem (22) and said disk (33).

3. The improved pilot valve of claim 2 wherein said seal (32) is an "O"-ring placed radially outwardly of said fastener (26).

4. The improved pilot valve of claim 1 wherein said fastener (26) is a threaded screw having an axial passage (77) provided therein.

5. The improved pilot valve of claim 1 wherein said valve seat (27) includes an "O" ring (67) in a groove at its top end for contacting said valve (28) and the improvement further comprises said downwardly facing surface of said disk (33) including coating means for prevention of sticking of said surface to said "O" ring 67 of valve seat 27.

6. The improved pilot valve of claim 1 wherein said first diaphragm (37) and said second diaphragm (36) are secured to said case at their outer periphery and wherein said improvement further comprises a spacer (11) disposed between said first and second diaphragms.

* * * * *